(12) United States Patent
Cai et al.

(10) Patent No.: US 8,625,911 B2
(45) Date of Patent: Jan. 7, 2014

(54) COMPRESSION OF 3D MESHES WITH REPEATED PATTERNS

(75) Inventors: Kang Ying Cai, Beijing (CN); Yu Jin, Beijing (CN); Zhi Bo Chen, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 121 days.

(21) Appl. No.: 13/379,405

(22) PCT Filed: Jun. 9, 2010

(86) PCT No.: PCT/EP2010/058048
§ 371 (c)(1),
(2), (4) Date: Dec. 20, 2011

(87) PCT Pub. No.: WO2010/149492
PCT Pub. Date: Dec. 29, 2010

(65) Prior Publication Data
US 2012/0106858 A1    May 3, 2012

(30) Foreign Application Priority Data

Jun. 23, 2009    (EP) .................................... 09305587

(51) Int. Cl.
*G06K 9/36*    (2006.01)

(52) U.S. Cl.
USPC ............ 382/232; 382/154; 382/225; 382/233

(58) Field of Classification Search
USPC ......... 382/232, 233, 244, 245, 240, 225, 251, 382/243, 118, 170; 345/418, 419, 420, 423, 345/427, 581; 375/E7.083; 703/1; 708/512
See application file for complete search history.

(56) References Cited

U.S. PATENT DOCUMENTS

| | | | | |
|---|---|---|---|---|
| 6,898,320 | B2 * | 5/2005 | Han et al. ....................... | 382/232 |
| 8,000,540 | B2 * | 8/2011 | Ahn et al. ...................... | 382/232 |
| 8,254,705 | B2 * | 8/2012 | Ahn et al. ...................... | 382/232 |

OTHER PUBLICATIONS

S.P. Mudur etal: "3D Compression of Engineering Models for Cooperative Computing Applications", Int'l Conf. on Infrastructure for E-Business. Jan. 21, 2002. pp. 1-10.
R. Amjoun etal: "Encoding Animated Meshes in Local Coordinates", Cyberworlds, IEEE, 2007, Oct. 24, 2007, pp. 437-446.
K. Cai etal: "Exploiting repeated patterns for efficient compression of massive models" Proc. of the 8th Int'l Conf. on Virtual Reality Continuum, Dec. 14, 2009, pp. 145-150.
P. Rungta: "Domain Based Lossless Text Compression-Report", Oct. 18, 2007, pp. 1-8.
Search Report dated Sep. 9, 2010.

* cited by examiner

*Primary Examiner* — Anh Do
(74) *Attorney, Agent, or Firm* — Myers Wolin LLC

(57) ABSTRACT

3D models of the engineering class usually have a large number of connected components, with small numbers of large triangles, often with arbitrary connectivity. To enable compact storage and fast transmission of large 3D mesh models, an efficient compression strategy specially designed for 3D mesh models is provide. A method for encoding a 3D mesh model comprises determining and clustering repeating components, normalizing the components, wherein scaling factors are clustered and orientation axes are clustered, encoding the connected components using references to the clusters, and entropy encoding the connected components.

17 Claims, 4 Drawing Sheets

COMPRESSION OF 3D MESHES WITH REPEATED PATTERNS

This application claims the benefit, under 35 U.S.C. §365 of International Application PCT/EP2010/058048, filed Jun. 9, 2010, which was published in accordance with PCT Article 21(2) on Dec. 29, 2010 in English and which claims the benefit of European patent application No. 09305587.9, filed Jun. 23, 2009.

FIELD OF THE INVENTION

This invention relates to a method and an apparatus for improved compression and decompression of 3D models, and particularly for large 3D models.

BACKGROUND

Large 3D engineering models like architectural designs, chemical plants and mechanical CAD (computer-aided design) designs are increasingly being deployed in various virtual world applications, such as Second Life™ and Google Earth™ In most engineering models there are a large number of small to medium sized connected components, each having up to a few hundred polygons on average. Moreover, this type of models has a number of geometric features that is repeated in various positions, scales and orientations, such as the "Meeting room" shown in FIG. 1.

Various algorithms have been proposed to compress 3D meshes efficiently since the early 1990s. Most of the existing 3D mesh compression algorithms work best for smooth surfaces with dense meshes of small triangles. However, large 3D models of the engineering class usually have a large number of connected components, with small numbers of large triangles, often with arbitrary connectivity. The architectural and mechanical CAD models typically have many non-smooth surfaces making these methods less suitable. Moreover, most of the earlier efforts deal with each connected component separately. In fact, the encoder performance can be greatly increased by removing the redundancy in the representation of repeating geometric feature patterns. To enable compact storage and fast transmission of large 3D engineering models, an efficient compression strategy specially designed for 3D mesh models (e.g. of engineering models) is needed. A good compression method for large 3D engineering models should be able to automatically discover the repeating geometry feature patterns and to effectively encode the necessary information for reconstructing the original model from the discovered geometry feature patterns.

[SBM01][1] proposed a method for automatically discovering repeating geometric features in large 3D engineering models. However, [SBM01] does not provide a complete compression scheme for 3D mesh models, particularly engineering models. Further, [SBM01] uses PCA (Principal Component Analysis) of positions of vertices of a component. As a consequence, components with same geometry and different connectivity will have same mean and same orientation axes. Further, [SBM01] is not suitable for detecting repeating patterns in various scales. Two components that differ only in scale (i.e. size) will not be recognized as repeating features of the same equivalence class. Further, it is desirable to compress the encoded data even more than described in [SBM01].

[1][SBM01]: D. Shikhare, S. Bhakar and S. P. Mudur. "Compression of Large 3D Engineering Models using Automatic Discovery of Repeating Geometric Features", 6th International Fall Workshop on Vision, Modeling and Visualization (VMV2001), Nov. 21-23, 2001, Stuttgart, Germany Thus, the method of [SBM01] needs further improvement.

SUMMARY OF THE INVENTION

The present invention provides an efficient compression method and corresponding apparatus, especially for 3D meshes that consist of many small to medium sized connected components and have geometric features that repeat in various positions, scales and orientations, such as 3D engineering models.

According to the invention, a method for encoding a 3D mesh model comprises the following steps: A first step is automatically analyzing the 3D mesh model, wherein repeating components are determined and classified into pattern clusters, a mean of each component is determined, and then the component is normalized, wherein the normalizing comprises determining scaling factors and classifying the scaling factors into scaling factor clusters, and determining orientation axes and clustering the orientation axes into orientation axis clusters. A second step is assigning unique cluster identifiers to the pattern clusters, scaling factor clusters and orientation axis clusters. A third step is encoding the connected components, wherein the connected components are compared to the pattern clusters, scaling factor clusters and orientation axis clusters, thereby obtaining a pattern cluster identifier, scale factor cluster identifier, scale factor residual, orientation axis cluster identifier and orientation residual. A further step is entropy encoding each connected component as represented by a pattern cluster identifier, scale factor cluster identifier, scale factor residual, orientation axis cluster identifier and orientation residual.

According to the invention, a method for decoding a 3D mesh model comprises following steps: Entropy decoding of received data, extracting a pattern cluster identifier and transformation information, wherein the transformation information comprises transformation cluster identifiers and transformation residuals, reconstructing a pattern according to the pattern cluster identifier, reconstructing transformation information according to the transformation cluster identifiers and transformation residuals, and transforming the reconstructed pattern according to the reconstructed transformation information.

An apparatus for encoding 3D mesh models comprises analyzing means or analyzer, assigning means, first encoding means (e.g. encoder) for encoding the connected components and second encoding means being an entropy encoder. The analyzing means is suitable for automatically analyzing the 3D mesh model, wherein repeating components are determined and classified into pattern clusters, a mean of each component is determined, and then the component is normalized, wherein the normalizing comprises determining scaling factors and classifying the scaling factors into scaling factor clusters, and determining orientation axes and clustering the orientation axes into orientation axis clusters. The assigning means is suitable for assigning unique cluster identifiers to the pattern clusters, scaling factor clusters and orientation axis clusters. The encoding means is suitable for encoding the connected components, wherein the connected components are compared to the pattern clusters, scaling factor clusters and orientation axis clusters, thereby obtaining a pattern cluster identifier, scale factor cluster identifier, scale factor residual, orientation axis cluster identifier and orientation residual. The entropy encoder is suitable for entropy encoding each connected component as represented by a pattern cluster identifier, scale factor cluster identifier, scale factor residual, orientation axis cluster identifier and orientation residual.

An apparatus for decoding 3D mesh models, as disclosed in claim 6, comprises an entropy decoder, data extraction means (e.g. de-multiplexer), pattern reconstruction means, trans-formation information reconstruction means and transforming means. The entropy decoder is suitable for entropy decoding received data. The data extraction means is suitable for extracting a pattern cluster identifier and transformation information, the transformation information comprising transformation cluster identifiers and transformation residuals. The pattern reconstruction means is suitable for reconstructing a pattern according to the pattern cluster identifier. The transformation information reconstruction means for reconstructing transformation information according to the transformation cluster identifiers and transformation residuals, and the transforming means is suitable for transforming the reconstructed pattern according to the reconstructed transformation information.

A signal according to the invention comprises data of an encoded 3D mesh model, the data comprising at least one pattern cluster identifier and transformation information, wherein the transformation information comprises transformation cluster identifiers and transformation residuals.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an exemplary 3D model ("Meeting room") with many repeating features.

DETAILED DESCRIPTION OF THE INVENTION

Figure 1:

The present invention provides an efficient compression method for large 3D engineering models. Such models are often composed of several partitions, so-called "connected components". The method comprises automatically discovering and removing the redundancy in the representation of repeating geometric feature patterns. In one embodiment, the repeating geometry patterns are discovered by normalizing the connected components, and then comparing the normalized components to each other. In one embodiment, all the connected components that are equivalent after normalization can be regarded as instances of one geometry pattern. In principle, equivalent components are clustered. A cluster may refer to only some, or to all components of a 3D model. Then each connected component can be represented by an identifier, such as an alphanumeric ID, of the corresponding geometry pattern (or clustering class) and the transformation information which can reconstruct the component from the geometry pattern. This transformation information may exemplary comprise one or more of scale factors, mean (or center), orientation axes (or rotation information), or shift information. In principle, also others are possible. Geometry patterns can be compressed by any (particularly any mature) 3D mesh compression method.

In one embodiment, the transformation information comprises at least the mean, orientation axes and scale factors of the corresponding component. In one embodiment, the orientation axes for each component may be in 3 different dimensions, e.g. x-axis, y-axis and z-axis. In one embodiment, the orientation axes of all connected components are clustered based on k-means clustering. In one embodiment, also the scale factors of all connected components are clustered based on k-means clustering. In one embodiment, the means are compressed by organizing them using a space tree, such as "k-d Tree": each leaf node records the geometry pattern ID, cluster IDs of orientation axes and cluster IDs of scale factors.

The present invention provides an efficient and complete compression scheme for 3D meshes consisting of many connected components and having lots of repeating geometric features, such as 3D engineering models. One key aspect of the invention is to discover and remove the redundancy in the representation of repeating geometric feature patterns. Another key aspect of the invention is to effectively compress the information that is necessary for reconstructing the original model from the discovered geometry feature patterns. One advantageous effect of the invention is that, compared with known methods, the amount of data describing a 3D mesh model is reduced. One advantageous effect is that the encoding gives more exact data, i.e. allows a more exact reconstruction. Therefore, encoding may provide enhanced quality, transmission and storage require less bandwidth, and/or decoding may be accelerated. Thus, the invention has advantages for encoding, transmission, storage and reconstruction of 3D models.

Figure 2:
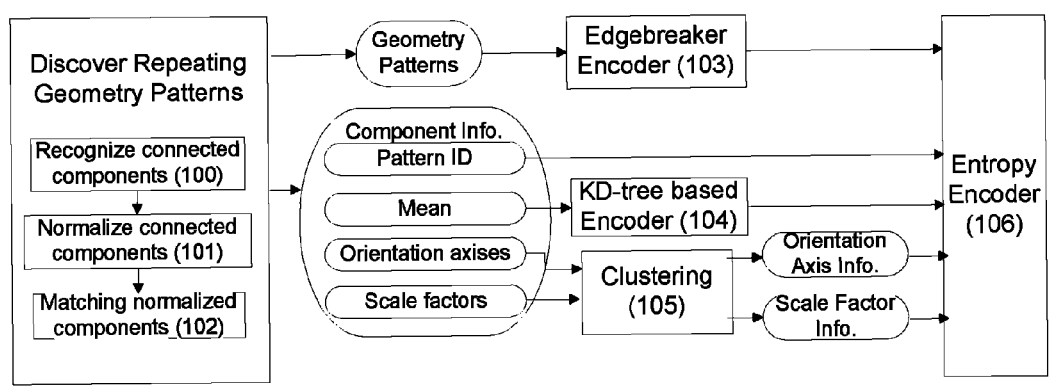
FIG. 2 the structure of encoding.
Figure 3:
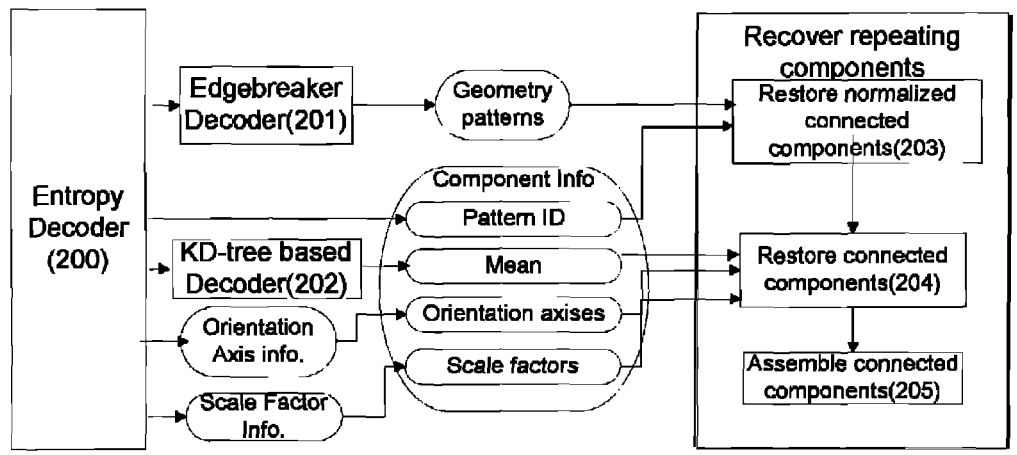
FIG. 3 the structure of decoding.

Block diagrams of the proposed encoder and decoder are shown in FIGS. 2 and 3.

FIG. 2 shows an encoder for 3D mesh models, according to one embodiment of the invention. The connected components are distinguished by a triangle transversal block 100. A normalization block 101 normalizes each connected component. In one embodiment, the normalization is based on a technique described in the European patent application EP09305527[2] which discloses a method for encoding a 3D mesh model comprising one or more components. The normalization technique of EP09305527 comprises steps of determining for a component an orthonormal basis in 3D space, wherein each vertex of the component is assigned a weight which is determined from coordinate data of said vertex and coordinate data of other vertices that belong to the same triangle, encoding object coordinate system information of the component, normalizing the orientation of the component relative to a world coordinate system, quantizing the vertex positions, and encoding the quantized vertex positions. In further embodiments, other normalization techniques may be used.

[2]PA090034

According to one aspect of the invention, both the orientation and scale of each connected component are normalized. [SBM01] only discloses normalizing the component orientation, and is therefore not suitable for discovering repeating features in various scales.

In FIG. 2, block 102 matches the normalized components for discovering the repeated geometry patterns. In principle, the matching method of [SBM01] can be used. Each connected component in the input model can be represented by the ID of the corresponding geometry pattern and the transformation information for reconstructing it from the geometry pattern. Preferably, the transformation information includes the geometry pattern representative for a cluster, three orientation axes and scale factors of the corresponding connected component. The mean (i.e. the center of the representative geometry pattern) is not transmitted, but recalculated at the decoder.

The geometry patterns can be compressed by any mature 3D mesh encoder, such as the Edgebreaker encoder [R99][3]. Also other mesh encoders can be used in the encoder block 103. Considering the large number of connected components in complex 3D models, the component information also consumes lots of storage. In one aspect, the present invention provides an efficient compression method for the component information.

[3][R99]: J. Rossignac. Edgebreaker: "Connectivity compression for triangle meshes", IEEE Transactions on Visualization and Computer Graphics, Vol. 5, No. 1, pp. 47-61, January-March 1999

It has been noticed that there often are some dominant orientations among all the connected components in large 3D engineering models. Thus, cluster analysis is a proper choice to encode the orientation axes 105. While any clustering algorithm may in principle be used, k-means [MQ67][4] is one of the simplest and most effective unsupervised learning algorithms that solve clustering problems. The procedure follows a simple and easy way to classify a given data set through a certain number of clusters. However, k being the number of clusters needs to be decided beforehand, which is usually not easy.

[4][MQ67]: J. B. MacQueen. "Some Methods for classification and Analysis of Multivariate Observations", Proceedings of 5-th Berkeley Symposium on Mathematical Statistics and Probability, Berkeley, University of California Press, 1:281-297, 1967.

In order to overcome this limitation, Block 105 performs k-means based cluster analysis as follows:

Suppose α is a user defined threshold.
Step 1: Set k as a small number, e.g. k=4.
Step 2: Classify the data set by k-means clustering.
Step 3: Check each cluster. Suppose n is the number of clusters whose variance is bigger than α.
   if (n>0) then {k=k+n; Go to Step 2} else END.

In one embodiment, orientation axes and scale factors are clustered using the above cluster analysis method respectively. The representative of each cluster defines a mode of orientation axis/scale factor. Orientation axes/scale factors can be predicted by a corresponding mode.

Figure 4:
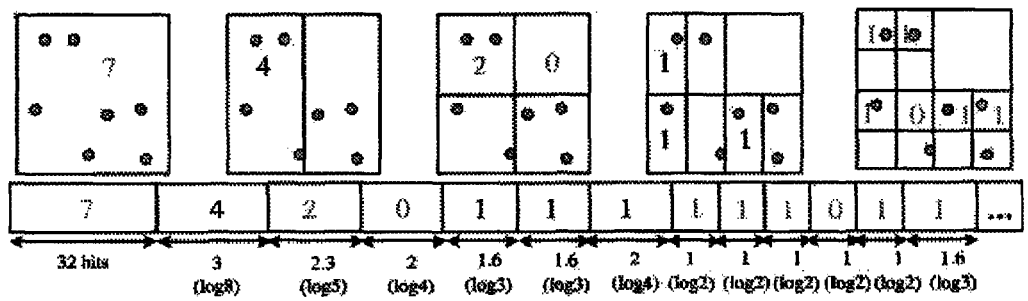
FIG. 4 the principle of kd-tree geometry coding in the 2D case.

Compression techniques that employ tree decomposition based on cell subdivisions is extremely efficient for processing discrete points. Block 104 uses e.g. a kd-tree based compression algorithm like [OG00][5] to encode the means of all connected components. This algorithm subdivides with each iteration a cell into two child cells and encodes the number of vertices in one of the two child cells, as shown in FIG. 4 and described in more detail below. If the parent cell contains p vertices, the number of vertices in one of the child cells can be encoded using $\log_2(p+1)$ bits with an arithmetic coder. This subdivision is recursively applied, until each non-empty cell is small enough to contain only one vertex and enables a sufficiently precise reconstruction of the vertex position. More details are given below. Besides kd-tree, in another embodiment octree based compression can also be used to compress all the means of connected components [PK05][6]. Note that in one embodiment the means (i.e. the center of the components) as such are not transmitted, but recalculated at the decoder.

[5][OG00]: O. Devillers, P. Gandoin. "Geometric compression for interactive transmission", in: IEEE Visualization, 2000, pp. 319-326

[6][PK05] Jingliang Peng, C.-C. Jay Kuo, "Geometry-guided progressive lossless 3D mesh coding with octree (OT) decomposition", ACM SIGGRAPH (ACM Transactions on Graphics 24(3)), 609-616, 2005

In one embodiment, each leaf node contains the following information of a component:
   geometry pattern ID IDs of the respective orientation axis cluster and the prediction residual;
IDs of the respective scale factor cluster and the prediction residual.

FIG. 3 shows a decoder, according to one embodiment of the invention. An encoded bit-stream is first entropy decoded 200, wherein different portions of data are obtained. One portion of the data is input to an Edgebreaker decoder 201 for obtaining geometry patterns. One portion of the data, including the representative of a geometry pattern cluster, is input to a kd-tree based decoder 202, which provides the mean (i.e. center) of each connected component. The mean, together with the other component information (pattern ID, orientation axes and scale factors) are delivered to a recovering block. The recovering block for recovering repeating components has a first block 203 for restoring normalized connected components, a second block 204 for restoring connected components (including the non-repeating connected components) and a third block 205 for assembling the connected components. In one embodiment, the decoder calculates the mean of each repeating pattern before restoring its instances. In a further block (not shown in FIG. 3), the complete model is assembled from the connected components.

According to one aspect of the invention, the entropy decoder 200 decodes also the orientation axis information. According to another aspect of the invention, the restoring of the connected components uses the mean, the geometry pattern ID, IDs of the respective orientation axis cluster and the orientation axis prediction residual, and IDs of the respective scale factor cluster and the scale factor prediction residual of each connected component. That is, e.g. for restoring the connected components size, the scale factor information (comprising a scale factor cluster ID and a prediction residual for each scale factor) is entropy decoded 200, the raw scale factor according to the cluster ID is generated and updated by the prediction residual, and the resulting scale factor used for scaling the model (in the respective dimension). The orientation axis decoding is handled in the same way.

Figure 7:
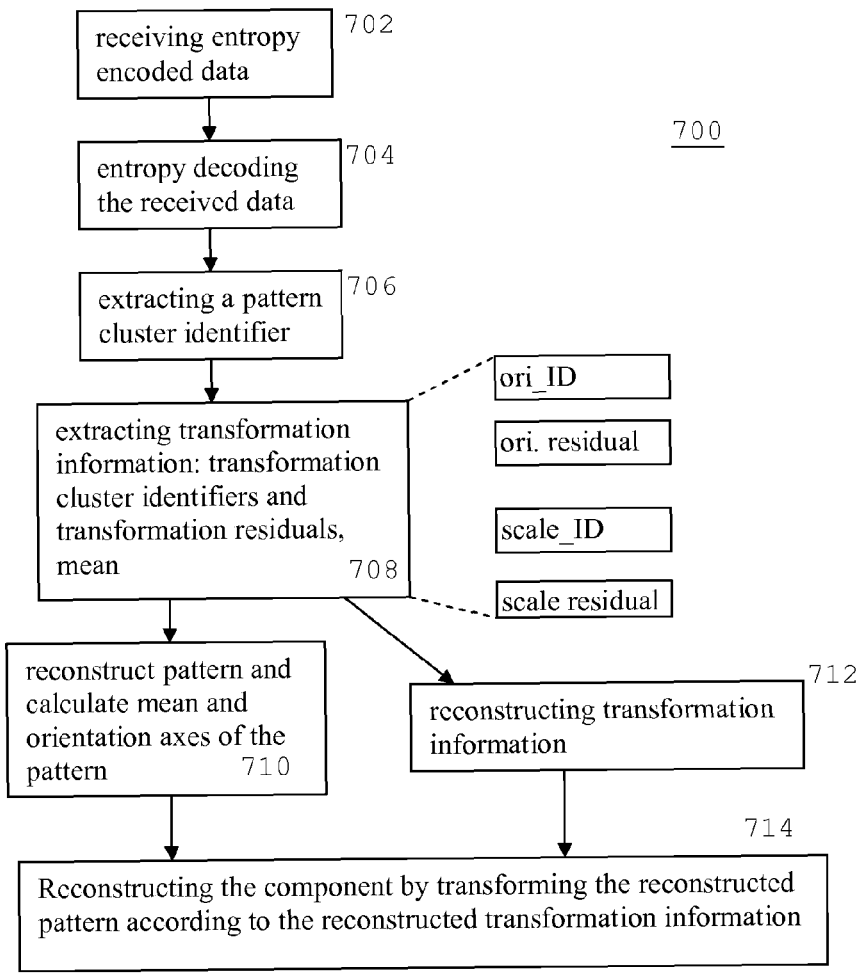
FIG. 7 exemplary reconstruction of a component.

The cluster reference values for each cluster (e.g. the geometric data of a pattern representing a pattern cluster) may be compressed and transmitted in the encoder, and received and decompressed in the decoder. In another embodiment, the decoder can obtain the cluster reference data from another data source using unique identifiers, eg. from the Internet. For example, the connectivity data of a particular exemplary pattern P1 represented by a pattern cluster PC1 may be encoded, transmitted and decoded. Thus, the decoder can reconstruct a pattern instance identified by reference to the pattern cluster PC1 by using the received pattern P1, scaling and rotating it according to scale information and orientation information, and move it to its destination according to the respective mean information. This is shown in FIG. 7. In one embodiment, there may be an additional step of adding residual data of the particular instance of the pattern before scaling and rotating (if the instance is not an exact copy of the reference pattern). In another embodiment, where the instances of a pattern cluster are exact copies of a component, no residual geometry data are used.

Figure 6:
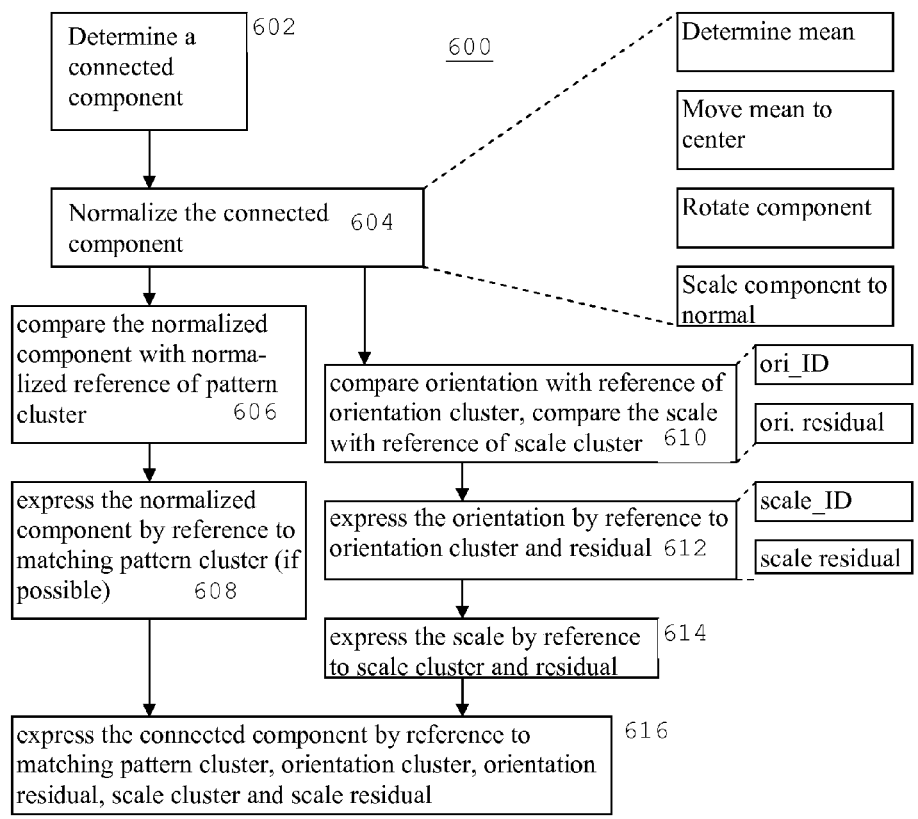
FIG. 6 exemplary encoding of a component.

FIG. 6 shows encoding steps of one embodiment of the invention. In principle, there are steps of determining a connected component 602, normalizing the component 604, and expressing 616 the normalized component, its orientation axes and scale factors relative to reference values (cluster representatives). The normalizing step 604 comprises determining the center (i.e. mean) of the component, moving the center to the center of the world coordinate system (transversal shift), rotating the component around 1, 2 or 3 axes, and scaling the component in 1, 2 or 3 dimensions.

In one embodiment of the invention, a bit-stream with a compressed 3D mesh model comprises:
- some bits to indicate the number of geometry patterns;
- for each geometry pattern, some bits to indicate the length of the compressed mesh data size; bits to show the compressed geometry pattern (e.g. cluster reference data);
- some bits to indicate the number of orientation axis modes;
- bits to show the details of each orientation axis mode (e.g. cluster reference data);
- some bits to indicate the number of scale factor modes;
- bits to show the details of each scale factor mode (e.g. cluster reference data);
- bits for recording the kd-tree;
- bits to show the geometry pattern ID and orientation axis mode ID of each leaf node of kd-tree.

The bit-stream can be further encoded by an entropy codec.

It is to be noted that in principle the compression according to the invention may be used for components that are expressed by reference to a pattern cluster, but also for other components that have individual patterns and no reference to any pattern cluster.

The present invention provides an improved method for compressing large 3D engineering models by discovering repeating geometry feature patterns and efficiently removing the redundancy therein. In one embodiment, the transformation information for reconstructing the original mesh from the geometry patterns is compressed based on cluster analysis and a kd-tree based codec.

FIG. 4 shows an illustrative example of the kd-tree geometry coding in the 2D case. Given n 2D points with integer coordinates of b bits, the starting cell is a rectangular bounding box of size $2^b \times 2^b$. The algorithm starts by encoding the total number of points n on an arbitrary fixed number of bits (for example 32). Then it starts the main loop, which consists in subdividing the current cell in two halves along the horizontal axis and then coding the number of points contained in one of them (e.g. the left one) on an optimal number of bits: if the parent cell contains p points, the number of points in the halfcell, which can take the p+1 values 0, 1, ..., p, will be coded on $\log_2(p+1)$ bits using arithmetic coding. The number of points contained in the second half-cell does not have to be explicitly encoded, since it can be deduced from the total number and the number transmitted for the first half-cell, after which each one of the two resulting cells is subdivided along the vertical axis according to the same rule. The process depicted in FIG. 4 iterates until there is no non-empty cell greater than 1×1. As shown on FIG. 4, the corresponding coding sequence consists only of the numbers of points: 7, 4, 2, 0, 1, 1, 1, 1, 1, 1, 0, 1, 1, .... The positions of these points are encoded in the order of the output. As the algorithm progresses, the cell size decreases and the transmitted data lead to a more accurate localization. A leaf node is a non-empty cell with the size 1×1. Each leaf node only contains one geometry pattern (the representative or mean of the geometry pattern cluster).

It is to be noted that the word "mean" may be used in different meanings herein: as the center of a component, or as a component that represents a geometry pattern cluster. Generally, mean of a pattern (i.e. its center) is not transmitted, as it can be calculated by the decoder. On the other hand, the mean of an instance (i.e. representative of a cluster of repeating instances), which is a geometry pattern, is transmitted. The representatives of the repeating instances are compactly transmitted by organizing them, in one embodiment, into a kd-tree.

In one embodiment, when normalizing a component, the present invention uses the "quadric error matrix" (QEM) method, while [SBM01] uses PCA of vertex positions. The QEM method is described in detail below, and further in [GH98][7]. As the QEM method depends on not only the vertex positions but also on the triangles of the mesh, it can give more precise orientation axes and mean than PCA of vertex positions. Thus, the accuracy of the present invention is enhanced as compared with the prior art systems. The decoder needs to calculate the mean of each pattern before restoring its instances.

[7]Michael Garland, Paul Heckbert: "Simplifying Surfaces with Color and Texture using Quadratic Error Metrics", Carnegie Mellon University 1998

Figure 5:
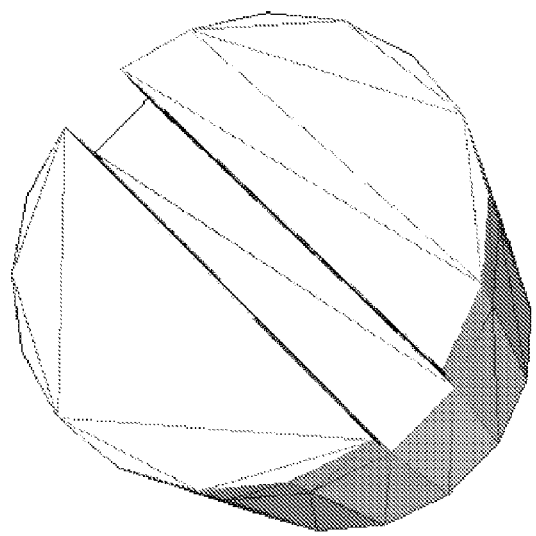
FIG. 5 an exemplary component for which it is particularly advantageous to use the "quadratic error matrix" method.

The QEM of a connected component is defined by all its triangles. Thus, by using the QEM, the mean and orientation axes of each component depend on not only the geometry but also connectivity of the component. For the component shown in FIG. 5, the quadric error matrix can give the unique orientation axes. However, PCA of vertex positions when used for normalizing orientation, can not do the same thing, as it can not distinguish the component from another component (e.g. a pure cylinder) with the same vertex positions. Thus, the quadric error matrix is a better choice for normalization of connected components.

In the following, advantages of an exemplary embodiment of the present invention over prior art, particularly [SBM01], are described.

Both the orientation and scale of each connected component are normalized in the present invention. Prior art, such as [SBM01], normalizes only the component orientation and can therefore not discover the repeating features in various scales. In [SBM01] it is mentioned that if the dimensions of the oriented bounding boxes (OBBs) of the two meshes do not match, then no further matching is performed.

Further, [SBM01] cannot compress transformation information. However, the present invention provides a complete solution for compressing the transformation information, including the position, orientation axes and scaling factors. For restoring a connected component from the corresponding pattern, the transformation information is required. In one embodiment, the transformation information of one connected component includes the position (for translation, 3 floating point values), orientation axes (for rotation, 4 floating point values) and scale factors (3 floating point values). Thus, the uncompressed transformation information for a connected component includes 10 floating point values. As there are usually a large number of connected components, it is an advantage of the present invention that it will significantly decrease the compression ratio of the transformation information of all connected components. And due to the data structure or a mode indication, the decoder can detect it.

Since [SBM01] mentions that a repeated instance of a pattern having k vertices requires three integers and seven floating point numbers, and this scheme of encoding begins to yield compression for a repeating pattern of four or more vertices, it is clear that transformation information, at least scale factors, are not clustered or compressed in [SBM01], and therefore a less efficient compression scheme is employed than in the present invention.

Further, the present invention may use quadric error matrix method to align components during discovery of repeating patterns. Thus, components with same geometry and different connectivity will have different mean and orientation axes. [SBM01] uses PCA of positions of vertices of the component, so that components with same geometry and different connectivity will have same mean and orientation axes.

During pair-wise component matching, both algorithms only compare the positions of vertices after transformation. Thus different components with same geometry and different topology can be distinguished (not in [SBM01]). An enhanced decoder according to the invention calculates the mean and orientation of a pattern to restore its repeating instances.

Further, for the degeneration cases of PCA (described above with reference to FIG. 5), the solution of the two methods is different, i.e. the present invention is superior to the solution of [SBM01].

Further, in the present invention, the position of all the repeating instances are compressed by a kd-tree based algorithm as described in [OG00]. Further, in the present invention, the orientation axes of the repeating instances are compressed by k-means based clustering analysis. Further, in the present invention, the scale factors of the repeating instances are compressed by k-means based clustering analysis.

In one embodiment of the method, signal or apparatus, the transformation information comprises geometric data of a component that is representative for a cluster. In one embodiment of the method, signal or apparatus, the center of the representative geometry pattern is not transmitted, but recalculated at the decoder.

In one embodiment of the encoding method, the clustering of at least the orientation axes and the scale factors uses an enhanced k-means clustering method with steps of performing k-means clustering based on an initial parameter k, wherein multiple clusters result;

for each of the clusters, determining a variance and comparing the determined variance with an initial variance threshold;

determining the number n of clusters in which the determined variance is higher than the threshold; and while in one or more clusters the determined variance is higher than the threshold, increasing the parameter k and repeating the steps of performing k-means clustering, based on the increased parameter k, determining for each cluster a variance and comparing the variance with the variance threshold, until the determined variance is below the threshold in all clusters.

In one embodiment of the apparatus for encoding, where the clustering of at least the orientation axes and the scale factors uses an enhanced k-means clustering, the apparatus comprises clustering means for performing k-means clustering based on an initial parameter k, wherein multiple clusters result; variance determining means for determining, for each of the clusters, a variance and comparator for comparing the determined variance with an initial variance threshold;

analyzing means for determining the number n of clusters in which the determined variance is higher than the threshold; and an adder for increasing the parameter k, while in one or more clusters the determined variance is higher than the threshold, wherein the k-means clustering can be repeated based on the increased parameter k until the determined variance is below the threshold in all clusters.

In one embodiment, the parameter k is increased by the number n of clusters that have a variance higher than the threshold.

In one embodiment, the method for decoding further comprises a step of calculating a mean or center of a component, wherein the transforming is applied to the center. In one embodiment, the decoder further comprises calculating means for calculating a mean or center of a component, wherein the transforming means applies its transforming to the center.

In one embodiment of the method for encoding, the step of determining the mean of a component comprises iterative kd-tree based compression with steps of assorting the vertices of the component according to their coordinates in an initial cell, subdividing with each iteration a cell into two child cells, encoding the number of vertices in one of the two child cells and applying the subdivision recursively until each non-empty cell is small enough to contain only one vertex. In one embodiment of the encoder, the means for determining the mean of a component performs iterative kd-tree based compression and has means for assorting the vertices of the component according to their coordinates in an initial cell, means for subdividing with each iteration a cell into two child cells, means for encoding the number of vertices in one of the two child cells and control means for applying the subdivision recursively until each non-empty cell is small enough to contain only one vertex.

In one embodiment of the method for encoding, the normalizing step 604 comprises determining the center of the component, moving the center to the center of the world coordinate system in a transversal shift, rotating the component around 1, 2 or 3 axes, and scaling the component in 1, 2 or 3 dimensions. In one embodiment of the apparatus for encoding, the normalizing means comprises calculating means for determining the center of the component, moving the center to the center of the world coordinate system in a transversal shift, rotating the component around 1, 2 or 3 axes, and scaling the component in 1, 2 or 3 dimensions.

In one embodiment of the encoding, a quadric error matrix method is used to align components during discovery of repetitive patterns.

In one embodiment of the encoding, the uncompressed transformation information for a connected component includes ten floating point values.

In one embodiment, the method for decoding further comprises a step of calculating the mean of each repeating component before restoring its instances, wherein a kd-tree based calculation method is used for calculating the mean. In one embodiment, the apparatus for decoding further comprises calculating means for calculating the mean of each repeating component before restoring its instances, wherein a kd-tree based calculation method is used for calculating the mean.

In one embodiment, the method for decoding further comprises an additional step of adding residual data of the particular instance of the pattern before scaling and rotating. In one embodiment, the apparatus for decoding further comprises an additional adding means for adding residual data of the particular instance of the pattern before scaling and rotating.

In one embodiment, the method for decoding further comprises an additional step of calculating the mean and orientation of a pattern before restoring its repeating instances. In one embodiment, the apparatus for decoding further comprises calculation means for calculating the mean and orientation of a pattern before restoring its repeating instances.

Thus, the present invention solves all above-mentioned problems and shortcomings of the prior art. For example, [SBM01] does not provide a solution for compressing the necessary information for restoring a connected component from the corresponding geometry pattern. Considering the large size of connected components that a 3D engineering model usually has, this kind of information will also consume a big amount of storage.

It will be understood that the present invention has been described purely by way of example, and modifications of detail can be made without departing from the scope of the invention.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to 3D engineering mesh models, one skilled in the art would recognize that the method and devices described herein may be applied to any 3D models. It is expressly intended that all combinations of those elements that perform substantially the same function in substantially the same way to achieve the same results are within the scope of the invention. Substitutions of elements from one described embodiment to another are also fully intended and contemplated.

Each feature disclosed in the description and the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for encoding a 3D mesh model that comprises a plurality of repeating connected components, the method being executed by an apparatus for encoding 3D mesh models and comprising:
    automatically analyzing the 3D mesh model, wherein the repeating components are determined, a center of each component is determined, the components are normalized and then classified into pattern clusters and a representative element of each pattern cluster is determined, wherein the normalizing comprises determining positions, determining scaling factors and classifying the scaling factors into scaling factor clusters, and determining orientation axes and clustering the orientation axes into orientation axis clusters;
    assigning unique cluster identifiers to the pattern clusters, scaling factor clusters and orientation axis clusters;
    encoding the representative element of each pattern cluster;
    encoding the components, wherein the components are compared to the pattern clusters, scaling factor clusters and orientation axis clusters, thereby obtaining at least a pattern cluster identifier, scale factor cluster identifier, scale factor residual, orientation axis cluster identifier and orientation residual;
    entropy encoding each component as represented by its respective pattern cluster identifier, position, scale factor cluster identifier, scale factor residual, orientation axis cluster identifier and orientation residual.

2. The method of claim 1, wherein the components in a pattern cluster have repeating geometry patterns and are discovered after said normalizing.

3. The method according to claim 1, wherein the clustering of at least the orientation axes and the scale factors uses an enhanced k-means clustering method with steps of
    performing k-means clustering based on an initial parameter k, wherein multiple clusters result;
    for each of the clusters, determining a variance and comparing the determined variance with an initial variance threshold;
    determining the number n of clusters in which the determined variance is higher than the threshold;
    while in one or more clusters the determined variance is higher than the threshold, increasing the parameter k and repeating the steps of performing k-means clustering, based on the increased parameter k, determining for each cluster a variance and comparing the variance with the variance threshold, until the determined variance is below the threshold in all clusters.

4. The method according to claim 3, wherein the parameter k of the k-means clustering is increased by the number n of clusters that have a variance higher than the threshold.

5. The method according to claim 1, wherein for said step of determining for each component a center comprises iterative kd-tree based compression with steps of assorting the vertices of the component according to their coordinates in an initial cell, subdividing with each iteration a cell into two child cells, encoding the number of vertices in one of the two child cells and applying the subdivision recursively until each non-empty cell is small enough to contain only one vertex.

6. The method according to claim 1, wherein the normalizing step comprises moving the center of a component to the center of the world coordinate system in a transversal shift, rotating the component around 1, 2 or 3 axes, and scaling the component in 1, 2 or 3 dimensions.

7. The method of claim 1 wherein the transformation information comprises geometric data defining the pattern of a component that is representative for a cluster.

8. The method of claim 7, wherein the center of a component is not transmitted, but recalculated during decoding.

9. A method for decoding a 3D mesh model, the method being executed by an apparatus for decoding 3D mesh models and comprising:
    entropy decoding received data;
    extracting a pattern cluster identifier and transformation information, the transformation information comprising one or more transformation cluster identifiers and one or more transformation residuals, wherein the transformation cluster identifiers comprise at least one of: an identifier of a scale factor cluster, an identifier of an orientation axis cluster, and an identifier of a position cluster or shift cluster;
    reconstructing a pattern according to the pattern cluster identifier;
    reconstructing transformation information according to the transformation cluster identifiers and transformation residuals, the transformation information comprising at least one of a scale factor, an orientation axis and a position; and
    transforming the reconstructed pattern according to the reconstructed transformation information.

10. The method according to claim 9, wherein the transformation information comprise a scale factor cluster identifier, a scale factor residual, an orientation axis cluster identifier and an orientation axis residual.

11. The method according to claim 9, further comprising a step of calculating a center of a component, wherein the transforming is applied to the center.

12. The method according to claim 9, further comprising a step of adding residual data of the particular instance of the pattern before scaling and rotating.

13. The method of claim 9, wherein the transformation information comprises geometric data defining the pattern of a component that is representative for a cluster.

14. The method of claim 13, wherein the center of a component is not transmitted, but recalculated during decoding.

15. An apparatus for encoding a 3D mesh model that comprises a plurality of repeating connected components being connected components with repeating geometric features, the apparatus comprising
- analyzing means for automatically analyzing the 3D mesh model, wherein repeating components are determined, a center of each component is determined, the components are normalized and then classified into pattern clusters and a representative element of each pattern cluster is determined, wherein the normalizing comprises determining positions, determining scaling factors and classifying the scaling factors into scaling factor clusters, and determining orientation axes and clustering the orientation axes into orientation axis clusters;
- assigning means for assigning unique cluster identifiers to the pattern clusters, scaling factor clusters and orientation axis clusters;
- encoding means for encoding the representative element of each pattern cluster and for encoding the components, wherein the components are compared to the pattern clusters, scaling factor clusters and orientation axis clusters, thereby obtaining a pattern cluster identifier, scale factor cluster identifier, scale factor residual, orientation axis cluster identifier and orientation residual;
- entropy encoder for entropy encoding each component as represented by a pattern cluster identifier, position, scale factor cluster identifier, scale factor residual, orientation cluster identifier and orientation residual.

16. An apparatus for decoding 3D mesh models, comprising
- entropy decoder for entropy decoding received data;
- data extraction means for extracting a pattern cluster identifier and transformation information, the transformation information comprising one or more transformation cluster identifiers and one or more transformation residuals, wherein the transformation cluster identifiers comprise at least one of: an identifier of a scale factor cluster, an identifier of an orientation axis cluster, and an identifier of a position cluster or shift cluster;
- pattern reconstruction means for reconstructing a pattern according to the pattern cluster identifier;
- transformation information reconstruction means for reconstructing transformation information according to the transformation cluster identifiers and transformation residuals, the transformation information comprising at least one of a scale factor, an orientation axis and a position; and
- transforming means for transforming the reconstructed pattern according to the reconstructed transformation information.

17. A non-transitory storage medium having recorded thereon a computer program that when executed on a computer causes the computer to execute a method for encoding a 3D mesh model that comprises a plurality of repeating connected components, the method comprising:
- automatically analyzing the 3D mesh model, wherein the repeating components are determined, a center of each component is determined, the components are normalized and then classified into pattern clusters and a representative element of each pattern cluster is determined, wherein the normalizing comprises determining positions, determining scaling factors and classifying the scaling factors into scaling factor clusters, and determining orientation axes and clustering the orientation axes into orientation axis clusters;
- assigning unique cluster identifiers to the pattern clusters, scaling factor clusters and orientation axis clusters;
- encoding the representative element of each pattern cluster;
- encoding the components, wherein the components are compared to the pattern clusters, scaling factor clusters and orientation axis clusters, thereby obtaining at least a pattern cluster identifier, scale factor cluster identifier, scale factor residual, orientation axis cluster identifier and orientation residual;
- entropy encoding each component as represented by its respective pattern cluster identifier, position, scale factor cluster identifier, scale factor residual, orientation axis cluster identifier and orientation residual.

\* \* \* \* \*